United States Patent
Patel et al.

(10) Patent No.: US 11,715,105 B2
(45) Date of Patent: Aug. 1, 2023

(54) PAYMENT AUTHENTICATION USING OS-BASED AND ISSUER-BASED AUTHENTICATOR APPLICATIONS

(71) Applicant: MASTERCARD INTERNATIONAL INCORPORATED, Purchase, NY (US)

(72) Inventors: Keyur Patel, Jersey City, NJ (US); Hemant Bhanushali, Brooklyn, NY (US); Sachin Ahuja, Millstone, NJ (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 52 days.

(21) Appl. No.: 17/001,989

(22) Filed: Aug. 25, 2020

(65) Prior Publication Data
US 2022/0067740 A1  Mar. 3, 2022

(51) Int. Cl.
*G06Q 20/40* (2012.01)
*G06Q 30/018* (2023.01)
*G06Q 20/38* (2012.01)
*G06K 7/14* (2006.01)
*G06F 21/44* (2013.01)
*G06Q 20/32* (2012.01)

(52) U.S. Cl.
CPC ....... *G06Q 20/40145* (2013.01); *G06F 21/44* (2013.01); *G06K 7/1417* (2013.01); *G06Q 20/3276* (2013.01); *G06Q 20/3829* (2013.01); *G06Q 30/0185* (2013.01); *G06Q 2220/00* (2013.01)

(58) Field of Classification Search
None
See application file for complete search history.

(56) References Cited

U.S. PATENT DOCUMENTS

| | | | |
|---|---|---|---|
| 2016/0314462 A1* | 10/2016 | Hong | G06Q 20/38215 |
| 2017/0264599 A1* | 9/2017 | O'Regan | H04L 63/0861 |
| 2018/0082082 A1* | 3/2018 | Lowenberg | G06Q 20/10 |
| 2019/0108504 A1 | 4/2019 | Blinov et al. | |
| 2020/0126355 A1* | 4/2020 | Yi | G06F 21/32 |
| 2020/0134626 A1 | 4/2020 | Abouelenin | |
| 2021/0012329 A1* | 1/2021 | Gandhi | G06Q 20/4016 |
| 2021/0182814 A1* | 6/2021 | Long | G06Q 20/20 |

OTHER PUBLICATIONS

International Search Report and Written Opinion issued in International Application No. PCT/US2021/046596, dated Nov. 22, 2021, 8 Pages.

* cited by examiner

*Primary Examiner* — Namrata Boveja
*Assistant Examiner* — Amit Patel
(74) *Attorney, Agent, or Firm* — Talem IP Law, LLP

(57) ABSTRACT

Payment authentication using OS-based (operating system-based) and issuer-based authenticator applications is provided. The described authenticator applications perform processes including managing a resource with information about registered users; receiving user identifiable information; authenticating a user using the user identifiable information and the information stored in the resource; upon authenticating the user using the user identifiable information and the information stored in the resource, generating a key tied to existing biometric authentication of the user and mapped to the user identifiable information; and communicating with a support server to provide the key and a notification of a potential transaction.

13 Claims, 9 Drawing Sheets

PAYMENT AUTHENTICATION USING OS-BASED AND ISSUER-BASED AUTHENTICATOR APPLICATIONS

BACKGROUND

E-commerce, buying and selling goods or services through internet, continues to thrive. However, identity theft, including the theft of credit card account numbers, is a major issue. Similarly, a number of software services and websites that handle personal information, including productivity applications and social media applications, can suffer from security issues. Two-step verification (also referred to as two-factor authentication) where a user typically enters a password at the website or productivity or social media application that is set up for the two-step verification and then receives a code via text, voice call, or authenticator application is growing in popularity to provide improved security.

An authenticator application generally implements a two-step verification service and may use a time-based one-time password algorithm and HMAC-based (hash-based message authentication codes) one-time password algorithm for authenticating users of mobile application and/or may support biometric authentication. To use an authenticator application, the authenticator application is generally installed on a mobile device and established for each site or application to which the user wants two-step verification. For a site or application to support use of the authenticator application, the site or application provides a shared key that is stored in the authenticator application. To log-in to a site or application that uses two-step verification and supports the use of an authenticator application, the user provides a username and password to the site or application. In some cases requiring entry of a one-time password, the site or application generates a one-time password. The user runs the authenticator application, which independently generates the same password that the user can use to enter into the site or application in order to authenticate their identity.

BRIEF SUMMARY

Payment authentication using OS-based (operating system-based) and issuer-based authenticator applications are described herein. The described payment-supporting authenticator applications communicate with a support server to facilitate payment authentication such that authenticator applications can be used to improve security of payment transactions.

A payment-supporting authenticator application can manage a resource with information about registered users. For OS-based authenticator applications, this resource can include identifying information such as email. For issuer-based authenticator applications, this resource can include identifying information such as a primary account number (PAN) (or a funding primary account number, FPAN). Then when the payment-supporting authenticator application receives user identifiable information to initiate an authentication process, the payment-supporting authenticator application authenticates a user using the user identifiable information and the information stored in the resource. In some cases, receiving the user identifiable information involves receiving a captured QR code and decoding the captured QR code to obtain the user identifiable information. In some cases, the user identifiable information is a hashed email (e.g., for OS-based authenticator applications) or a hashed PAN (e.g., for issuer-based authenticator applications).

Upon authenticating the user using the user identifiable information and the information stored in the resource, the payment-supporting authenticator application generates a key tied to existing biometric authentication of the user and mapped to the user identifiable information; and communicates with a support server to provide the key and a notification of a potential transaction.

In some cases, the payment-supporting authenticator application further prompts the user for biometric authentication; and upon receiving a biometric marker from the user, the payment-supporting authenticator application determines whether the biometric marker received from the user satisfies a biometric criterion based on the existing biometric authentication of the user. Upon the determination that the biometric criterion is satisfied, the payment-supporting authenticator application communicates with the support server to enable the potential transaction to be performed.

All or some of the features of the payment-supporting authenticator application may be performed at the mobile device on which the payment-supporting authenticator application resides. All or some of the features of the payment-supporting authenticator application may be executed remotely via services invoked by the payment-supporting authenticator application. Accordingly, some features may be carried out directly at the mobile device while other features may be carried out through communications with services supporting the payment-supporting authenticator application.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 4A-4E illustrate user interfaces a user may encounter through the process of purchasing items through an online merchant and utilizing an authenticator application.

DETAILED DESCRIPTION

Payment authentication using OS-based (operating system-based) and issuer-based authenticator applications are described herein. The described payment-supporting authenticator applications communicate with a support server to facilitate payment authentication such that authenticator applications can be used to improve security of payment transactions.

Figure 1:
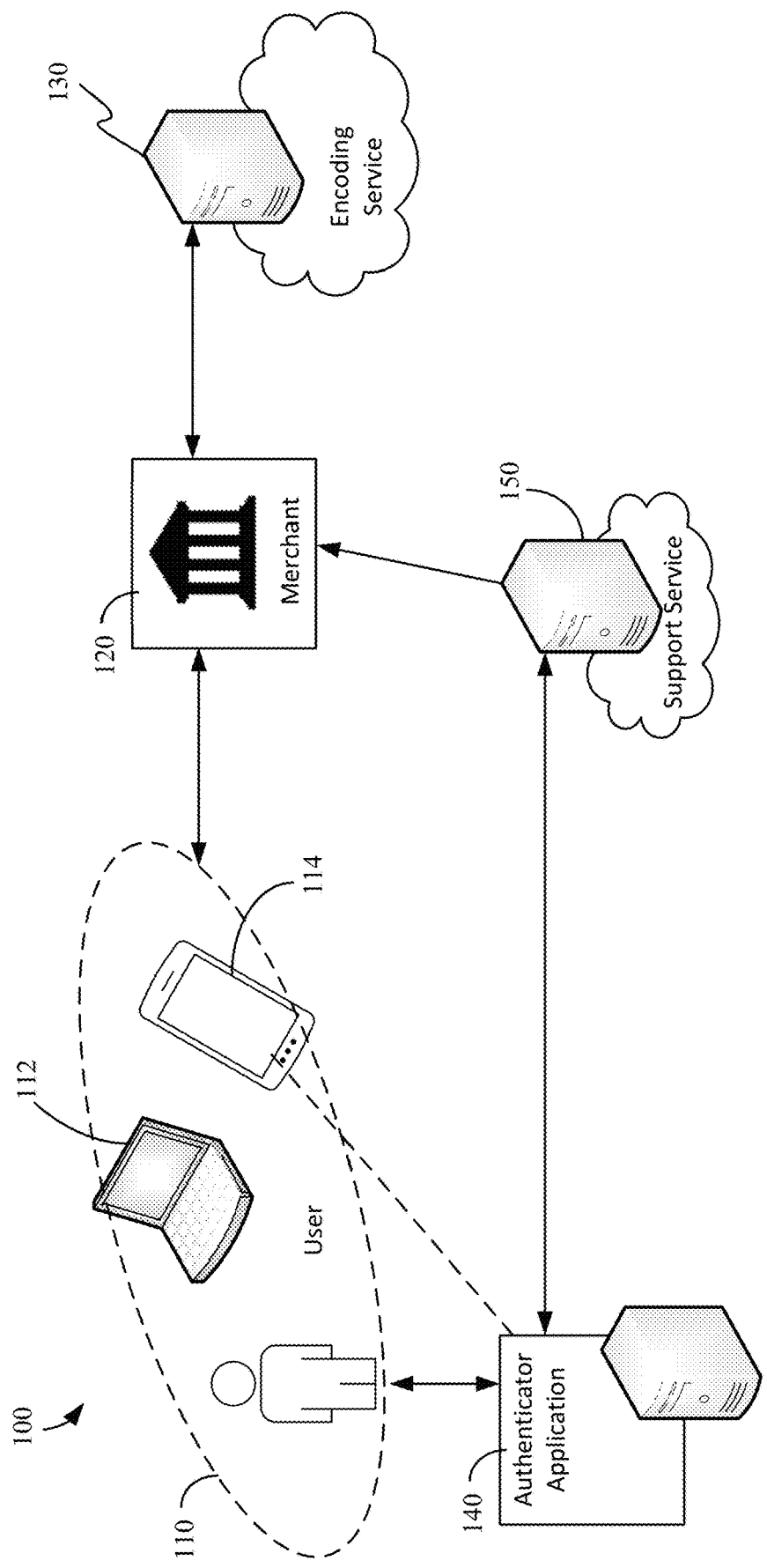
FIG. 1 illustrates an example environment for authenticating a user.

FIG. 1 illustrates an example environment for authenticating a user. Referring to FIG. 1, an operating environment 100 can include a user 110 (which may include user devices 112 and 114), a merchant 120, an encoding service 130, an authenticator application 140, and a support service 150. The user 110 can send a request to purchase goods and services (e.g., from user device 112), register for an event, request and/or submit information, and/or make a donation request to a merchant 120 to initiate a transaction, as well as send at least some of the user's identifiable information (e.g., a user's email address) to the merchant 120. Upon receiving the request for the transaction with at least some of the user's identifiable information, the merchant 120 sends a request for a QR code to the encoding service 130. The encoding service then generates a QR code containing some form of the user's identifiable information (e.g., a hashed email address) and sends the QR code back to the merchant 120. The merchant 120 may then display (e.g., on user device 112) that QR code for capturing by the user 110 (e.g., on user device 114).

The user 110 can then open the authenticator application 140 and scan/photograph the QR code (e.g., via user device 114). In some cases, the authenticator application 140 can access the user's camera (e.g., on user device 114) to take a photograph of the QR code (e.g., directly from a display screen on user device 112 or from a printed version of the QR code). In some cases, the authenticator application 140 can access the user's photographs or the user 110 can select a particular photograph (e.g., photograph of the QR code stored on user device 114) and send that photograph to the authenticator application 140. Upon capturing the QR code, the authenticator application 140 can decode the captured QR code to obtain the user identifiable information and search a resource (e.g., that supports the authenticator application) for previously stored information that matches the form of the user's identifiable information contained in the QR code. Upon matching the previously stored information and the form of the user's identifiable information, the authenticator application 140 can generate a key tied to the user's identifiable information and, optionally, biometrics of the user (e.g., that are also stored in the resource supporting the authenticator application 140). The key is then provided to the support service 150, which adds the key to an application instance and sends an indication that the key was successfully added to the authenticator application 140.

The operating environment 100 can also support biometric authentication. For example, after authenticating the user's identifiable information, the authenticator application 140 can send a prompt/request for a biometric marker of the user 110 (e.g., through user device 114). The user 110 can scan and send the biometric marker (e.g., thumbprint of the user 110) to the authenticator application 140. Upon receipt of the biometric marker of the user 110, the authenticator application 140 can determine whether the received biometric marker satisfies a biometric criterion based on a previously stored biometric marker of the user 110. For example, the authenticator application 140 may receive a biometric marker, such as a thumbprint, from the user 110 when the user 110 initially signs up for the authenticator application 140. The authenticator application 140 can store that thumbprint in a resource that supports the authenticator application 140. When the user 110 wishes to biometrically authenticate, the user can scan and send the user's thumbprint (e.g., by using user device 114) to the authenticator application 140, which the authenticator application 140 can use to measure against the previously stored thumbprint of the user 110. If the received thumbprint close enough to the stored thumbprint (e.g., within a predetermined tolerance for variance), the user is biometrically authenticated.

Upon biometric authentication, the authenticator application 140 can send confirmation of authentication to the support service 150. Once received, the support service 150 can send a payment credential (or registration credential, or donation credential, or information credential, whichever is applicable) to the merchant 120. The merchant can then send an indication to the user 110 (e.g., via the user's device 112) that the transaction was successful.

As used herein, when referring to actions performed by a "user," these actions may encompass actions performed by the user on the user's device or actions performed by the user's device in response to another action performed by the user.

Figure 2:
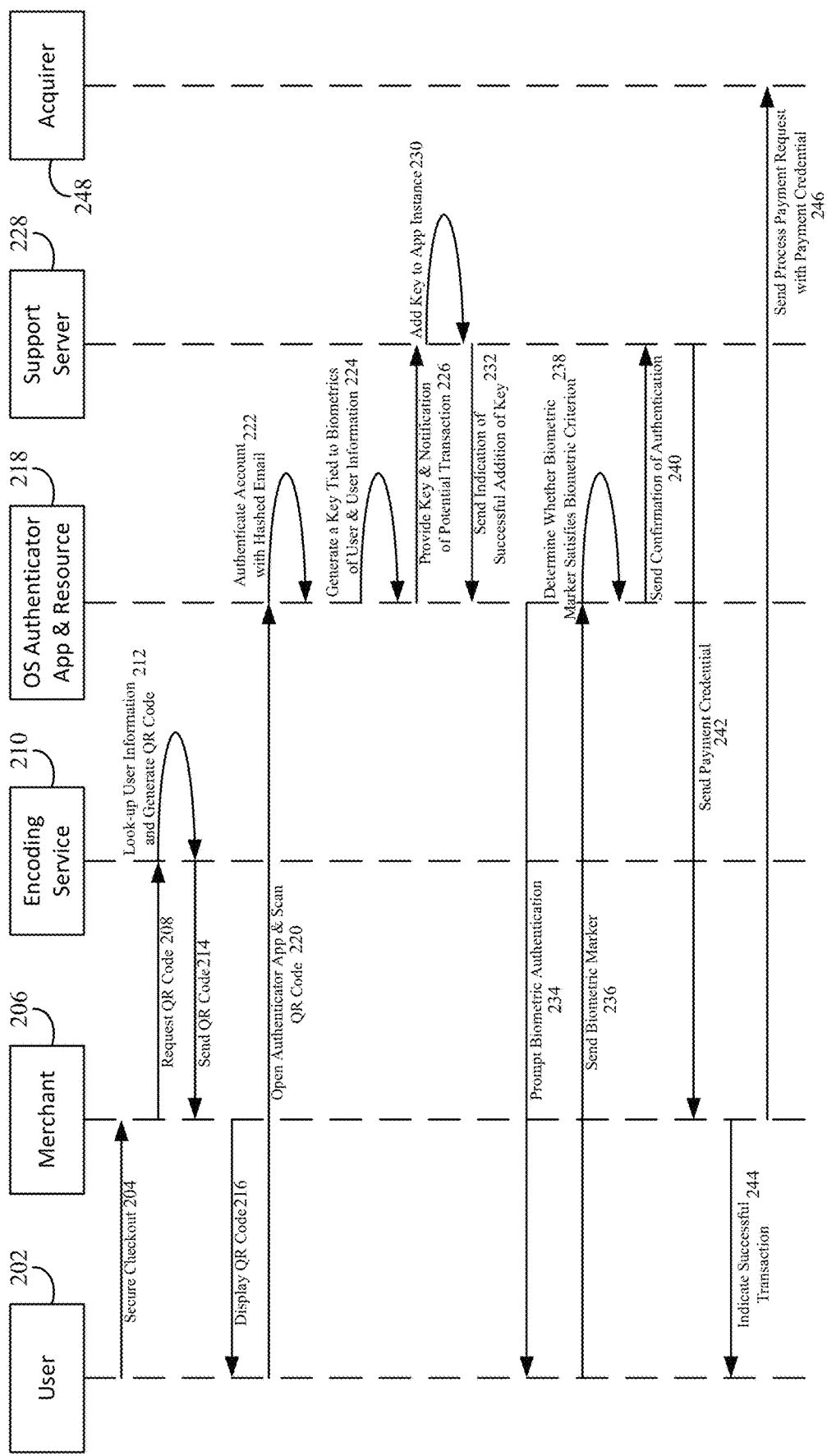
FIG. 2 illustrates an example sequence diagram for authenticating a user by using an OS-based authenticator application.

FIG. 2 illustrates an example sequence diagram for authenticating a user by using an OS-based authenticator application. Referring to FIG. 2, the illustrated environment includes a user 202, merchant 206, encoding service 210, OS-Based authenticator application 218, support server 228, and acquirer 248. The sequence flow can begin when a user 202 requests (204) to purchase items through a secure checkout from a merchant 206. When the merchant 206 receives the secure checkout request (204), the merchant 206 requests (208) a QR code containing the user's information (e.g., user's hashed email) from an encoding service 210. The encoding service 210 can be associated with the payment-supporting authenticator application 218 or at least has access to or stores information that would be understood by the authenticator application 218. For OS-based authenticator applications, this information includes the user's email; however, any suitable user-identifiable information can be used. In response to the request for the QR code, the encoding service 210 performs a look-up of the user's information and generates the QR code (212). The encoding service 210 then sends (214) the QR code back to the merchant 206, which subsequently displays (216) the QR code to the user 202.

Next, the user 202 opens an OS-based authenticator application 218 and scans (220) the QR code displayed at the merchant 206. The OS-based authenticator application 218 then authenticates the user by using and/or matching (222) the user's information (e.g., hashed email) contained in the QR code and the user's information that has been previously stored in the OS-based authenticator resource that stores information about registered users (e.g., the email or any other suitable user-identifiable information and even the user's biometric) and is managed by the OS-based authenticator application 218. Upon authenticating the user, the OS-based authenticator application 218 generates (224) a key tied to biometrics of the user 202 that has been previously stored in the OS-based authenticator resource 218 and the user's information.

Next, the key and a notification of a potential transaction are provided (226) to a support server 228. The support server 228 then adds (230) the key to an app instance and sends (232) an indication of a successful key addition to the OS-based authenticator application 218.

Upon receiving the indication of the successful key addition, the OS-based authenticator application 218 prompts (234) the user 202 to biometrically authenticate. The user 202 then sends (236) the biometric marker to the OS-based authenticator application 218 for authentication. The OS-based authenticator application 218 then determines whether the biometric marker received from the user 202 satisfies (238) a biometric criterion based on the biometrics of the user 202 that have been previously stored in the OS-based authenticator resource 218.

Upon confirmation that the biometric marker received from the user 202 satisfies (238) the biometric criterion, the OS-based authenticator application 218 sends (240) confirmation of authentication to the support server 228. The support server 228 then sends (242) a payment credential to the merchant 206 for payment processing.

Upon receiving the payment credential, the merchant 206 sends (244) an indication to the user 202 that the transaction is successful/complete. At the same time or at a later time (e.g., when batch payment processing is performed), the merchant 206 sends (246) a process payment request along with the payment credential to an acquirer 248 for payment processing.

It should be understood that all or some of the features/functionality of the OS-based payment-supporting authenticator application 218 may be performed at the mobile device on which the OS-based payment-supporting authenticator application 218 resides. All or some of the features of the OS-based payment-supporting authenticator application 218 may be executed remotely via services invoked by the OS-based payment-supporting authenticator application. Accordingly, some features may be carried out directly at the mobile device while other features may be carried out through communications with services supporting the OS-based payment-supporting authenticator application 218.

It should also be understood that instead of purchasing goods and/or services, a user could be attempting to submit information (e.g., a news article) or requesting information (e.g., confidential business data) in a way that requires authentication of the user. Therefore, the "merchant" may be an entity corresponding with activities other than purchase of goods and/or services in an environment that requires authentication of the user.

Figure 3:
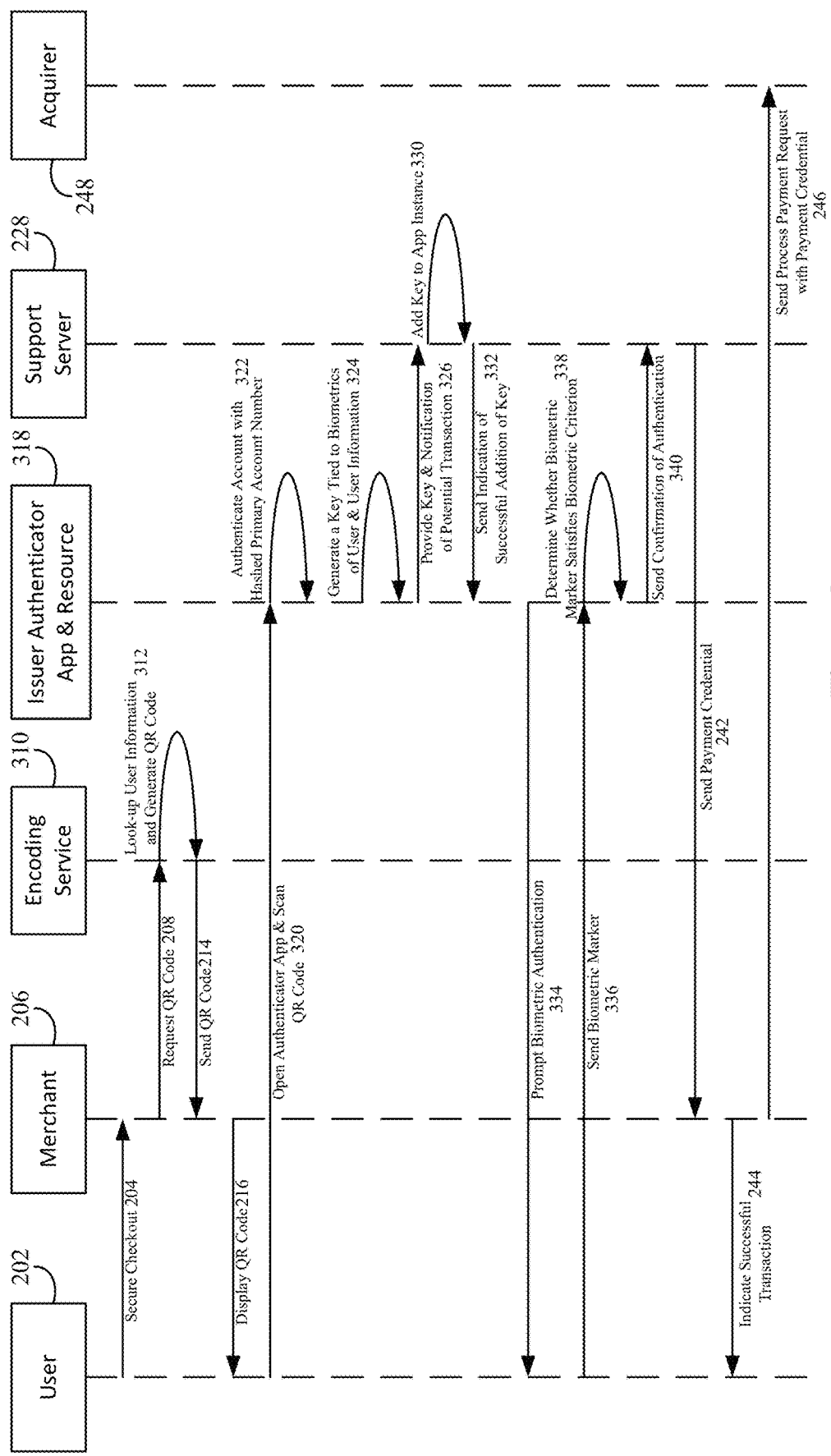
FIG. 3 illustrates a sequence diagram for authenticating a user by using an issuer-based authenticator application.

FIG. 3 illustrates an example sequence diagram for authenticating a user by using an issuer-based authenticator application. Similar to the sequence illustrated in FIG. 2, the sequence flow can begin when a user 202 requests (204) to purchase items through a secure checkout from a merchant 206. When the merchant 206 receives the secure checkout request (204), the merchant 206 requests (208) a QR code containing the user's information (e.g., user's personal account number) from an encoding service 310. The encoding service 310 can be associated with a payment-supporting authenticator application 318 or at least has access to or stores information that would be understood by the authenticator application 318. For issuer-based authenticator applications, this information includes the user's personal account number (PAN); however, any suitable user-identifiable information can be used. In response to the request for the QR code, the encoding service 310 then performs a look-up of the user's information and generates the QR code (312). In some cases, the encoding service encodes information understood by an OS-based authenticator application and information understood by an issuer-based authenticator application and the authenticator application uses the information that it understands. The encoding service 310 then sends (214) the QR code back to the merchant 206, which subsequently displays (216) the QR code to the user 202.

Next, the user 202 opens an issuer-based authenticator application 318 and scans (320) the QR code displayed at the merchant 206. The issuer-based authenticator application 318 then authenticates the user by using and/or matching (322) the user's information (e.g., user's hashed personal account number) contained in the QR code and the user's information that has been previously stored in the issuer-based authenticator resource that stores information about registered users (e.g., the PAN or any other suitable user-identifiable information and even the user's biometric) and is managed by the issuer-based authenticator application 318. Upon authenticating the user, the issuer-based authenticator application 318 generates (324) a key tied to biometrics of the user 202 that has been previously stored in the issuer-based authenticator resource 318 and the user's information.

Next, the key and a notification of a potential transaction are provided (326) to a support server 228. The support server 228 then adds (330) the key to an app instance and sends (332) an indication of a successful key addition to the issuer-based authenticator application 318.

Upon receiving the indication of the successful key addition, the issuer-based authenticator application 318 prompts (334) the user 202 to biometrically authenticate. The user 202 then sends (336) the biometric marker to the issuer-based authenticator application 318 for authentication. The issuer-based authenticator application 318 then determines whether the biometric marker received from the user 202 satisfies (338) a biometric criterion based on the biometrics of the user 202 that have been previously stored in the issuer-based authenticator resource 318.

Upon confirmation that the biometric marker received from the user 202 satisfies (338) the biometric criterion, the issuer-based authenticator application 318 sends (340) confirmation of authentication to the support server 228. The support server 228 then sends (342) a payment credential to the merchant 206 for payment processing.

Upon receiving the payment credential, the merchant 206 sends (244) an indication to the user 202 that the transaction is successful/complete. At the same time or at a later time (e.g., when batch payment processing is performed), the merchant 206 sends (246) a process payment request along with the payment credential to an acquirer 248 for payment processing.

It should be understood that all or some of the features/functionality of the issuer-based payment-supporting authenticator application 318 may be performed at the mobile device on which the issuer-based payment-supporting authenticator application 318 resides. All or some of the features of the issuer-based payment-supporting authenticator application 318 may be executed remotely via services invoked by the issuer-based payment-supporting authenticator application. Accordingly, some features may be carried out directly at the mobile device while other features may be carried out through communications with services supporting the issuer-based payment-supporting authenticator application 318.

It should also be understood that instead of purchasing goods and/or services, a user could be attempting to submit information (e.g., a news article) or requesting information (e.g., confidential business data) in a way that requires authentication of the user. Therefore, the "merchant" may be an entity corresponding with activities other than purchase of goods and/or services in an environment that requires authentication of the user.

Figure 4A:
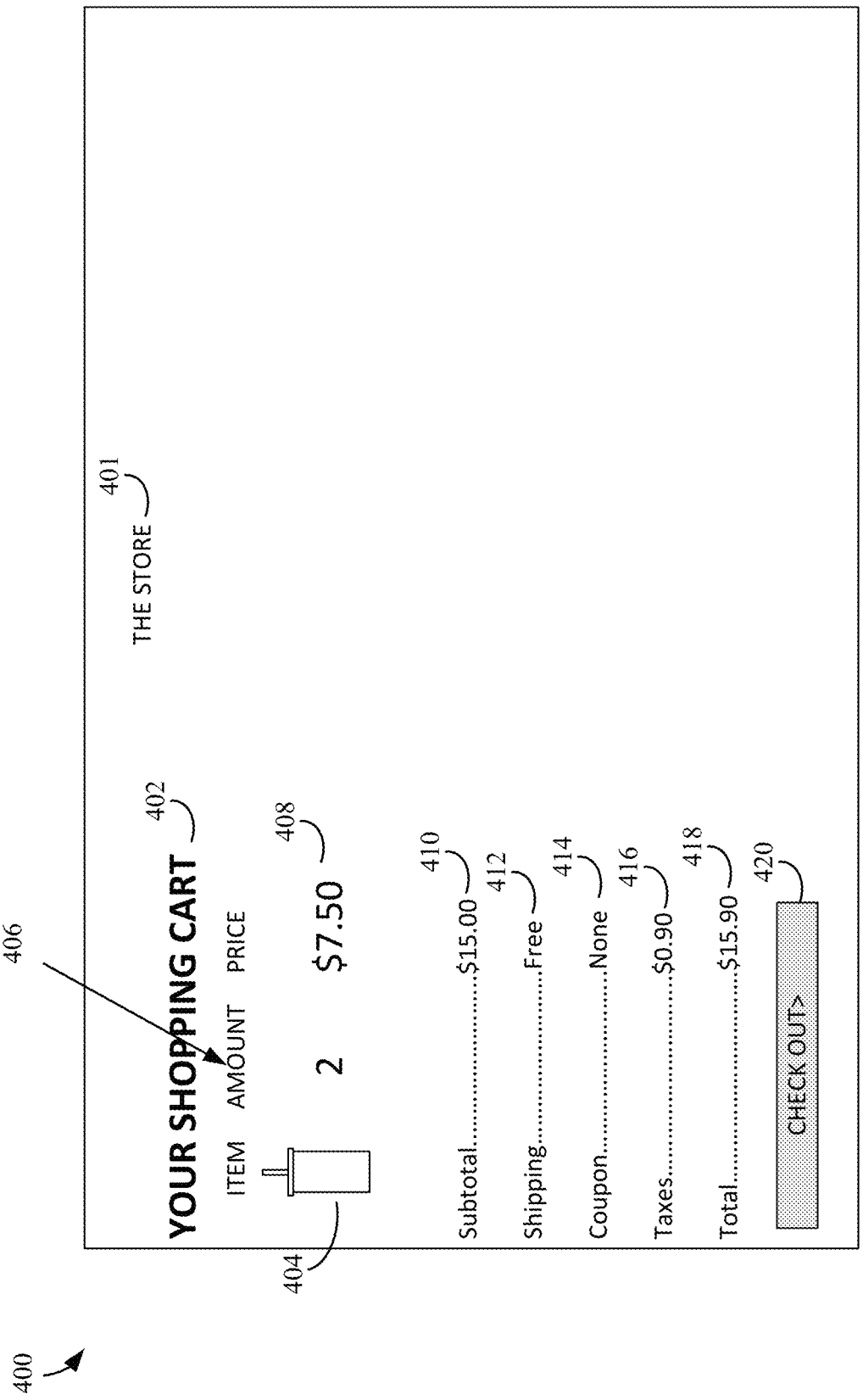

FIGS. 4A-4E illustrate user interfaces a user may encounter through the process of purchasing items through an online merchant and utilizing an authenticator application. Specifically, FIG. 4A illustrates an example of a user interface of an online shopping cart. As can be seen, the user interface 400 (e.g., a user interface displayed on display screen of a laptop) includes the name of the merchant 401, which in this case is "The Store." The user interface 400 also includes the shopping cart 402. In this example, the shopping cart 402 includes the item(s) 404 the user has selected, the amount 406 of that item(s) 404, and the price 408 for each item 404. The shopping cart 402 also includes a subtotal 410 (which in this case equals the amount 406 of the item(s) multiplied by the price 408 for each item(s)), the shipping cost 412, any coupon(s) 414 that have been applied, taxes 416, and the (grand) total 418 (which is the sum of the subtotal 410, shipping cost 412, coupon(s) 414, and taxes 416). The user may select (e.g., by clicking, tapping, etc.) the check out 420 to begin the payment process for the item(s) 404 selecting in the shopping cart 402.

Figure 4B:
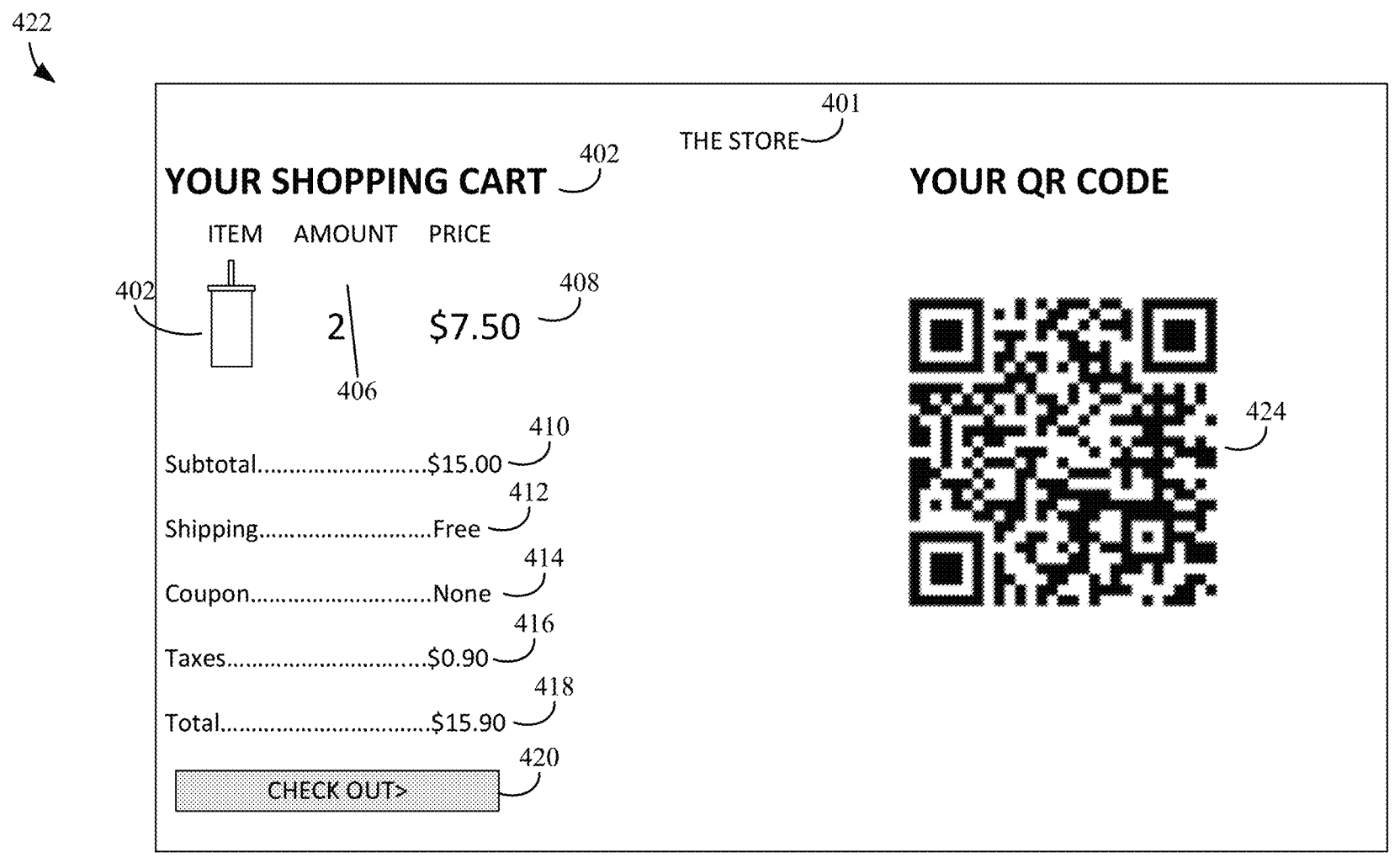

As illustrated in the user interface 422 of FIG. 4B, upon the selection of the check out 420 by the user and in some cases, as part of entering payment details, the merchant retrieves and then displays a QR code 424 on the user interface 422. As described above, the QR code 424 contains the user's information (e.g., user's hashed email and/or hashed primary account number, which the user may have previously entered when the user signed into the merchant's website before shopping or entered after selection of the check out 420) and is retrieved from an encoding service. The encoding service transforms the user's information to generate the QR code, which is then sent back to the merchant for display on the user interface 422.

Figure 4D:
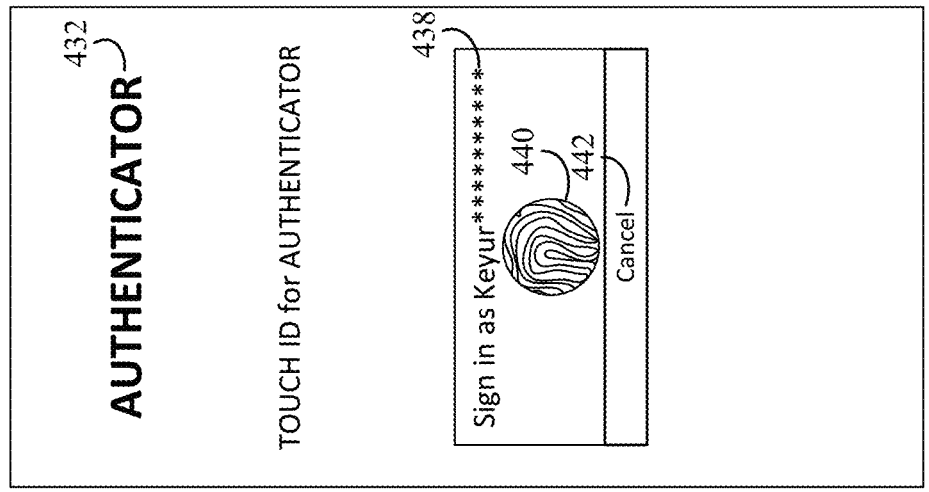
Figure 4C:
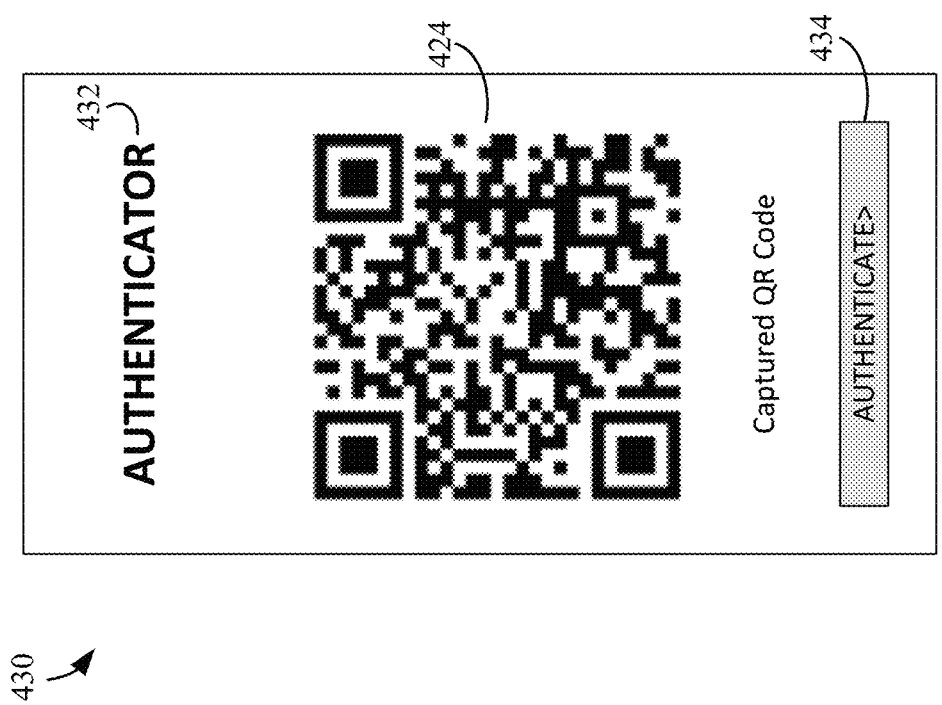
Figure 4E:
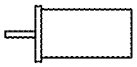

As illustrated in the user interface 430 of FIG. 4C, a user opens an authenticator application 432 and captures the QR code 424. This action may be performed, for example, by opening the authenticator application 432 on a mobile device of the user (e.g., the user's cellular phone) and taking a photograph of the QR code 424, which may be displayed on a different device of the user (e.g., display screen of the user's laptop). This may be accomplished, for example, by allowing the authenticator application 432 access to the user's device's camera (e.g., to take a photograph of the QR code while within the authenticator application 432) and/or by allowing the authenticator application access to the photographs stored on the user's device (e.g., so that the user can open the camera on their cellular phone and take a picture of the QR code 424, which is subsequently retrieved from the photographs stored on the user's device by the authenticator application 432). It should be understood that the types of devices the user uses to display and capture the QR code 424 may vary and can be done on any device that is capable of performing the functions described above, as will be explained in more detail below. It should also be understood that, in some cases, a QR code is not used at all, and the user's information may be passed in mediums other than a QR code. For example, the user's information may be passed in app-to-app communications, which may eliminate the need for the encoding service.

Turning back to FIG. 4C, once the QR code 424 is captured in the authenticator application 432, the user can select authenticate 434 to begin the authentication process. Upon the selection of the authenticate 434 by the user, the authenticator application 432 authenticates the user by using/matching the user's information contained in the QR code with the user's information that has been previously stored in a resource of the authenticator application 432. Once the user is authenticated, the authenticator application 432 generates a key tied to biometrics of the user (that has also been previously stored in the resource of the authenticator application 432 in a way that is tied to the user's information that is stored in the resource of the authenticator application 432).

The key and a notification of a potential transaction are then provided by the authenticator application 432 to a support server (e.g., payment processing server such as a MasterCard server). The support server then adds the key to an app instance and sends an indication of a successful key addition to the authenticator application 432.

As illustrated in the user interface 436 of FIG. 4D, upon receiving the indication of the successful key addition from the support server, the authenticator application 432 prompts the user for a biometric marker of the user by displaying a message 438 for signing in to the user's account along with a representation 440 of the type of biometric marker the authenticator application 432 needs for authentication. For example, in FIG. 4D, the biometric marker the authenticator application 432 needs for authentication is a fingerprint/thumbprint. However, in other cases, the biometric marker the authenticator application 432 needs for authentication may be a facial scan, iris scan, voice, and/or hand geometry, among others. The user may also select cancel 442 to cancel the authentication process.

Once the user enters the biometric marker on the user's device, the authenticator application 432 determines whether the biometric marker satisfies a biometric criterion based on a previously stored biometric marker (e.g., stored in a resource of the authenticator application).

If the biometric marker received from the user satisfies the biometric criterion, the authenticator application 432 sends confirmation of authentication to the support server, which in turn sends a payment credential to the merchant for payment processing. As illustrated in the user interface 444 of FIG. 4E, the merchant will then display an order confirmation 446 along with an order number 448.

Figure 5A:
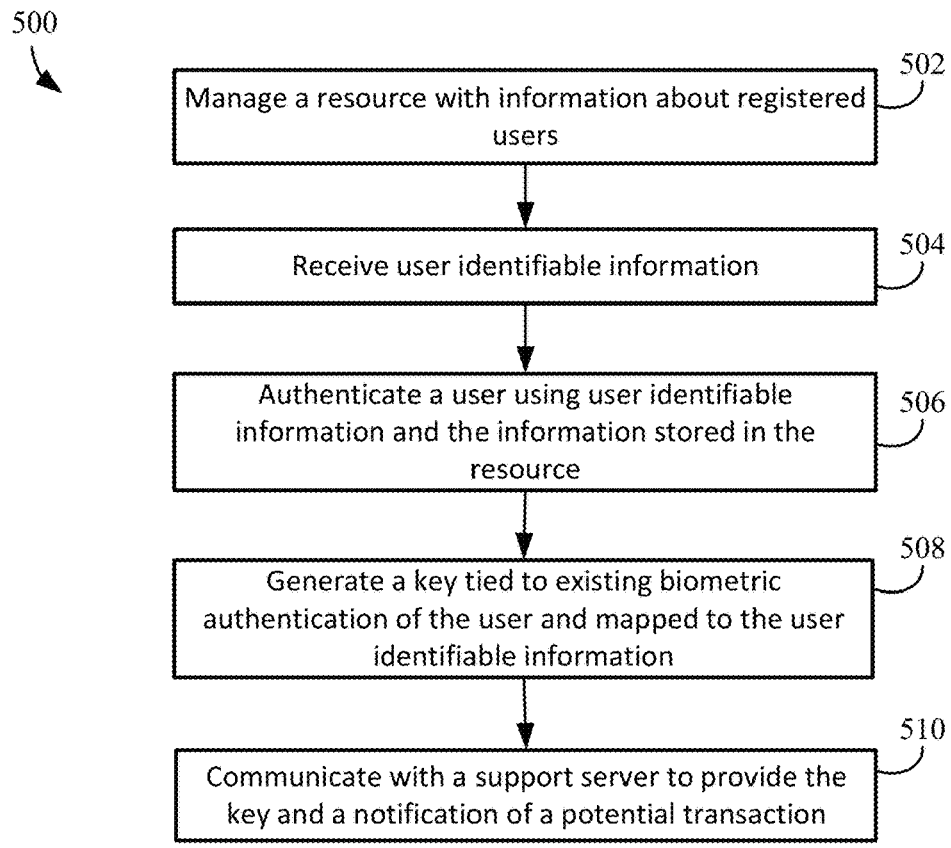
FIG. 5A illustrates a flowchart of the steps performed by an authenticator application to authenticate a user.

FIG. 5A illustrates a flowchart of the steps performed by an authenticator application to authenticate a user. The process 500 includes managing (502) a resource with information about registered users. For instance, the authenticator application may store information about users, such as the user's email address, account number (e.g., a person's credit or debit card account number), username, biometric markers (e.g., facial scan, iris scan, voice, and/or hand geometry), password(s), and other information that can be used to identify a user in a storage resource. The user's information may be collected directly from the user or may be collected from third parties when the user initially signs up to the authenticator application. The operation of managing the resource may be performed asynchronously or concurrently with the other process steps.

At some point in time, the authenticator application receives (504) user identifiable information along with an authentication request from the user. This may happen, for example, when a merchant or other third-party entity requires a user to authenticate themselves before making a purchase, sign up for an event, request something (e.g., information about an event or entity), or other actions that require user authentication. Upon receiving the user's information, the authenticator application authenticates (506) a user using the user identifiable information and the information stored in the resource. For example, if the user identifiable information includes an email address with the authentication request, the authenticator application may search the storage resource for an email address that matches the email address submitted with the authentication request; when the authenticator application finds a match, the user is authenticated. It should be understood that email addresses, usernames, account numbers, and the like may be converted to hash values when initially stored, such that the authenticator application is searching for a specific hash value (e.g., that corresponds to the user's email address) as opposed to the actual user information (e.g., the user's email address). Furthermore, multiple items of information may be stored in the storage resource as part of the user's account in the authenticator application (e.g., a username, hashed email address, account number, user's date of birth, biometric marker(s) of the user, etc.).

Upon authenticating the user using the user identifiable information and the information stored in the resource, the authenticator application generates (508) a key tied to (e.g., associated with) existing biometric authentication of the user and mapped to the user identifiable information. The key that is generated may contain the user's information that is sent from the user and/or information that is different than the information that is sent from the user but that is still tied to the account of the user. For example, the authenticator application may receive a hashed email address and match that hashed email address with a hash value that is already stored in the storage resource. When the key is generated, the user information that the key is tied to may be the username (e.g., as opposed to the user's hashed email address). It should also be understood that the key may be tied to multiple items of user information (e.g., hashed user email address, account number, and biometric marker of the user).

Next, the authenticator application communicates (510) with a support server to provide the key and a notification of a potential transaction. The potential transaction may be the purchase of goods and/or services, registration for an event, or a donation, to name a few.

Figure 5B:
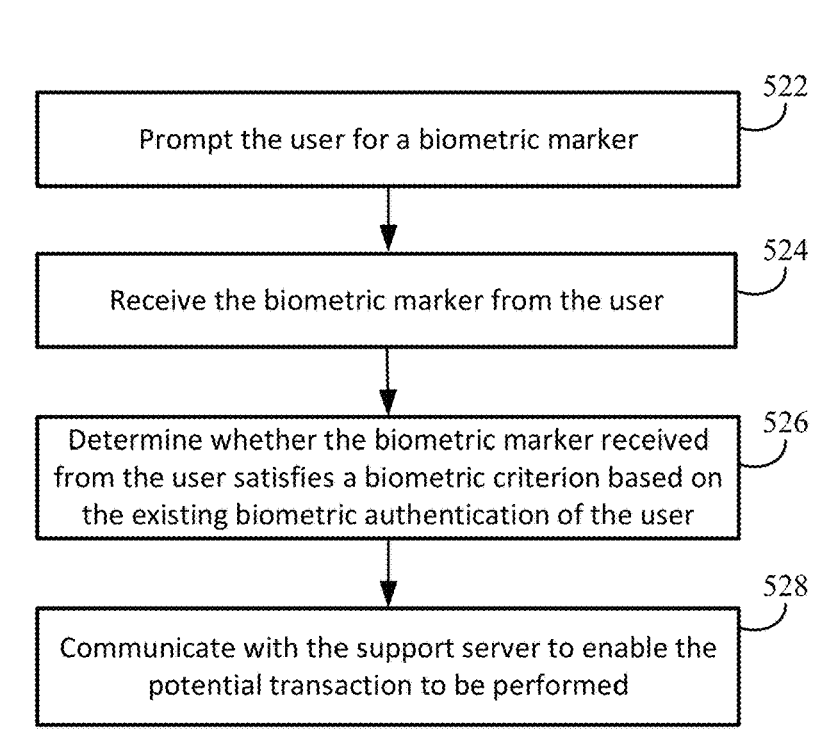
FIG. 5B illustrates a flowchart of additional steps that may be performed by an authenticator application to authenticate a user.

FIG. 5B illustrates a flowchart of additional steps that may be performed by an authenticator application to authenticate a user. In some cases, as provided in process 520 the authenticator may perform biometric authentication after the authentication using the user's information. As illustrated in FIG. 5B, the authenticator application may then prompt (522) the user for the user's biometric marker (e.g., a facial scan of the user via the user's mobile device). Next, the authenticator application receives (524) the biometric marker from the user.

Upon receiving the biometric marker of the user, the authenticator application determines (526) whether the biometric marker satisfies a biometric criterion based on the existing biometric authentication from the user. For example, when the user sends a facial scan of the user to the authenticator app, the authenticator application may check the storage resource to see whether the facial scan sent from the user matches a facial scan that is tied to an account that has already been authenticated using the user identifiable information and the information stored in the resource.

Upon the determination that the biometric criterion is satisfied, the authenticator application communicates (528) with the support server to enable the potential transaction to be performed. For example, the authenticator application may send a confirmation that the user has been biometrically authenticated. In some cases, the authenticator application may send a private key with information that is needed to by the support server to perform the transaction that was not originally sent with the initial key and the notification of the potential transaction.

Figure 6A:
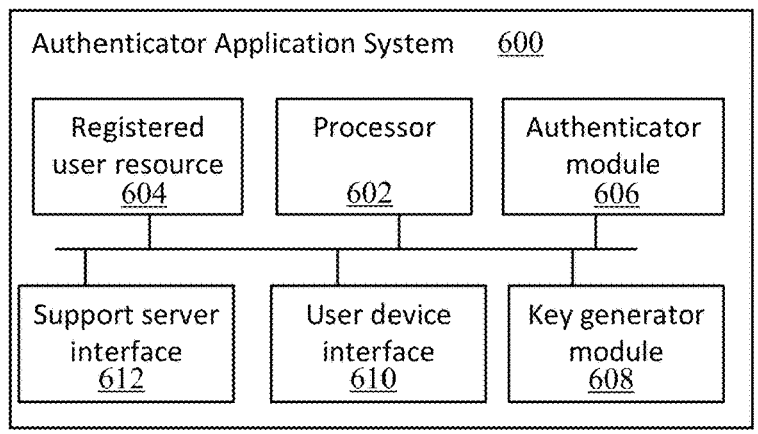
FIG. 6A illustrates a simplified block diagram of an example authenticator application system.

FIG. 6A illustrates a simplified block diagram of an example authenticator application system. Authenticator application system 600 can host remote (from user device) aspects of an authenticator application such as described with respect authenticator application 140 of FIG. 1, OS authenticator app & resource 218 of FIG. 2, and Issuer authenticator app & resource of FIG. 3. For example, authenticator application system 600 can include one or more processors 602, a registered user resource 604, authenticator module 606, key generator module 608, user device interface 610, and support server interface 612.

The registered user resource 604 can store user identifiable information that is used to authenticate a user as part of an authenticator application.

The authenticator module 606, under the control of the one or more processors 602, authenticates a user using user identifiable information and the information stored in the registered user resource 604. The authenticator module 606 further determines whether a biometric marker received from the user satisfies a biometric criterion based on the existing biometric authentication of the user.

The key generator module 608 generates a key tied to the existing biometric authentication of the user. The key is mapped to the user identifiable information stored in the registered user resource 604.

The user device interface 610 enables the authenticator application system 600 to communicate with the user device (e.g., user device 112 or 114 of FIG. 1) and obtain a user biometric marker and a QR code or the user identifiable information encoded by the QR code.

The support server interface 612 enables the authenticator application system 600 to communicate with the support server (e.g., support service 150 of FIG. 1, support server 228 of FIGS. 2 and 3), for example, to provide the key generated by the key generator module 608 and a notification of a potential transaction.

Figure 6B:
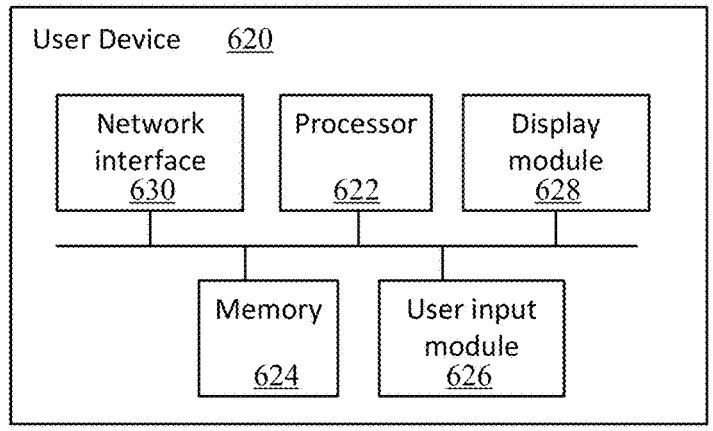
FIG. 6B illustrates a simplified block diagram of a user device.

FIG. 6B illustrates a simplified block diagram of a user device. User device 620 can be any suitable computing device (such as user device 112 or 114 of FIG. 1) and can be embodied as a mobile phone, smart watch, laptop, tablet, desktop, or other computing device. User device 620 can include a processor 622, memory 624, user input module 626, display module 628, and network interface 630. Of course, more or fewer elements described with respect to device 620 may be incorporated to implement a particular computing device.

Processor 622 can include one or more processors to transform or manipulate data according to the instructions of software stored in the memory 624. Examples of processor 622 include general purpose central processing units, application specific processors, and logic devices, as well as any other type of processing device, combinations, or variations thereof.

Memory 624 may comprise any computer readable storage media readable by the processor 622 and capable of storing software such as an authenticator application (e.g., local aspects of application 140 of FIG. 1), a web browser application, merchant applications, and wallet applications. Memory 624 can include removable and non-removable memories and can include random access memory, read only memory, magnetic disks, optical disks, CDs, DVDs, flash memory, magnetic cassettes, magnetic tape, magnetic disk storage or other magnetic storage devices, or any other suitable storage media as examples.

The user input module 626 receives and interprets user input, such as input from a microphone, from a touch screen display, from a biometric scanner (e.g., fingerprint, camera/image sensor), from a QR code scanner (e.g., camera), and from buttons or keys on the device, to provide resulting information to appropriate modules or applications such as the authenticator application (e.g., application 140 of FIG. 1), as well as enabling the user to send a request to purchase goods and services, register for an event, request and/or submit information, and/or make a donation request to a merchant to initiate a transaction, and send at least some of the user's identifiable information (e.g., a user's email address) to the merchant.

Display module 628 supports the rendering and display of content and application graphical user interfaces, such as graphical interfaces and content for purchasing from an online merchant and the authenticator application interface to authenticate the purchase. Examples of interfaces are shown in FIGS. 4A-4E.

Network interface 630 provides communication connections and devices that allow for user device 620 to communicate over a communication network or collection of networks, or the air with other computing devices and systems.

Figure 6C:
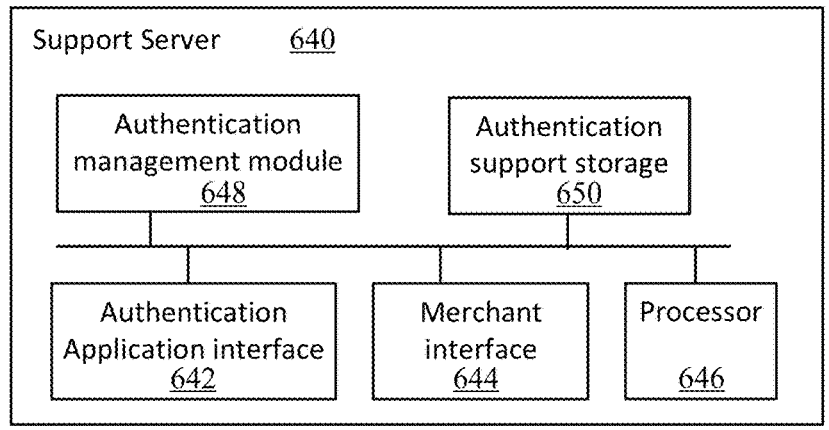
FIG. 6C illustrates a simplified block diagram of a support server.

FIG. 6C illustrates a simplified block diagram of a support server. Referring to FIG. 6C, a support server 640 can include an authentication application interface 642, a merchant interface 644, one or more processors 646, an authentication management module 648, and authentication support storage 650.

The authentication application interface 642 can enable the support server 640 to receive, from an authenticator application, a key tied to a user's identifiable information and, optionally, biometrics of that user, as well as a notification of a potential transaction. The authentication application interface 642 can also enable the support server 640 to receive, from an authenticator application, a confirmation of biometric authentication. The authentication application interface 642 further enables the support server 640 to communicate with the authentication application, for example, to send an indication that the key was successfully added to authentication support storage 650.

The authentication management module 648, under control of the one or more processors 646 adds the key received via the authentication application interface 642 to an application instance stored in the authentication support storage 650.

Authentication support storage 650 can store application instance information and corresponding keys. Authentication support storage 650 can also store credentials for a transaction. The credentials can include a payment credential, or registration credential, or donation credential, or information credential associated with the application instance.

The merchant interface 644 can enable the support server 640 to send a credential (e.g., the payment credential, registration credential, donation credential, or information credential) to a merchant for payment processing.

Embodiments may be implemented as a computer process, a computing system, or as an article of manufacture, such as a computer program product or computer-readable medium. Certain methods and processes described herein can be embodied as software, code and/or data, which may be stored on one or more storage media that when executed by one or more processor direct the system to perform the methods and processes described herein. Certain embodiments of the invention contemplate the use of a machine in the form of a computer system within which a set of instructions, when executed, can cause the system to perform any one or more of the methodologies discussed above. Certain computer program products may be one or more computer-readable storage media readable by a computer system (and executable by a processing system/one or more processors) and encoding a computer program of instructions for executing a computer process. It should be understood that as used herein, in no case do the terms "storage media," "computer-readable storage media" or "computer-readable storage medium" consist of transitory carrier waves or propagating signals. Instead, "storage" media refers to non-transitory media.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method of payment-supporting authentication, comprising:
   managing, via an authenticator application, a resource with information about registered users;
   receiving, via the authenticator application accessing a camera and capturing a photograph or accessing stored photographs on a user device, a captured QR code comprising user identifiable information and information of a potential transaction;
   decoding, via the authenticator application, the captured QR code to obtain the user identifiable information and the information of the potential transaction;
   upon decoding the captured QR code, receiving, via a graphical user interface of the authenticator application, an indication to authenticate a user from input of the user;
   authenticating, via the authenticator application, the user using the user identifiable information and the information stored in the resource;
   upon authenticating the user using the user identifiable information and the information stored in the resource, generating, via the authenticator application, a key tied to existing biometric authentication of the user and mapped to the user identifiable information;
   communicating, via the authenticator application, with a support server to provide the key and a notification of the potential transaction;
   prompting, via the graphical user interface of the authenticator application, the user to provide a biometric marker via the user device;
   receiving, via the authenticator application accessing a biometric scanner or microphone of the user device, the biometric marker from the user after authenticating the user using the user identifiable information and the information stored in the resource;
   determining, via the authenticator application, whether the biometric marker received from the user satisfies a biometric criterion based on the existing biometric authentication of the user; and
   upon the determination that the biometric criterion is satisfied, communicating, via the authenticator application, with the support server to enable the potential transaction to be performed.

2. The method of claim 1, wherein the user identifiable information is a hashed email.

3. The method of claim 1, wherein the user identifiable information is a hashed primary account number.

4. The method of claim 1, wherein the information about registered users comprises at least email addresses.

5. The method of claim 1, wherein the information about registered users comprises at least primary account numbers.

6. A computing device, comprising:
   a processor;
   a storage device; and an authenticator application having instructions stored in the storage device that when executed by the processor, direct the computing device to:
- manage a resource with information about registered users;
- receive, by accessing a camera and capturing a photograph or accessing stored photographs on the computing device, a captured QR code comprising user identifiable information and information of a potential transaction;
- decode the captured QR code to obtain the user identifiable information and the information of the potential transaction;
- upon decoding the captured QR code, receive, via a graphical user interface, an indication to authenticate a user from input of the user;
- authenticate the user using the user identifiable information and the information stored in the resource;
- upon the authenticating the user using the user identifiable information and the information stored in the resource, generate a key tied to existing biometric authentication of the user and mapped to the user identifiable information;
- communicate with a support server to provide the key and a notification of the potential transaction;
- prompt, via the graphical user interface, the user to provide a biometric marker;
- receive, via accessing a biometric scanner or microphone of the computing device, the biometric marker from the user after authenticating the user using the user identifiable information and the information stored in the resource;
- determine whether the biometric marker received from the user satisfies a biometric criterion based on the existing biometric authentication of the user; and
- upon the determination that the biometric criterion is satisfied, communicate with the support server to enable the potential transaction to be performed.

7. The computing device of claim 6, wherein the user identifiable information is a hashed email.

8. The computing device of claim 6, wherein the user identifiable information is a primary account number.

9. The computing device of claim 6, wherein the authenticator application is an issuer-based authenticator application.

10. The computing device of claim 6, wherein the authenticator application is an operating system-based authenticator application.

11. One or more computer-readable storage media having instructions for authenticating user information stored thereon that when executed, direct a processor to:
- manage, via an authenticator application, a resource with information about registered users;
- receive, via the authenticator application accessing a camera and capturing a photograph or accessing stored photographs on a user device, a captured QR code comprising user identifiable information and information of a potential transaction;
- decode, via the authenticator application, the captured QR code to obtain the user identifiable information and the information of the potential transaction;
- upon decoding the captured QR code, receive, via a graphical user interface of the authenticator application, an indication to authenticate a user from input of the user;
- authenticate, via the authenticator application, the user using the user identifiable information and the information stored in the resource;
- upon the authenticating the user using the user identifiable information and the information stored in the resource, generate, via the authenticator application, a key tied to existing biometric authentication of the user and mapped to the user identifiable information;
- communicate, via the authenticator application, with a support server to provide the key and a notification of the potential transaction;
- prompt, via the graphical user interface of the authenticator application, the user to provide a biometric marker via the user device;
- receive, via the authenticator application accessing a biometric scanner or microphone of the user device, the biometric marker from the user after authenticating the user using the user identifiable information and the information stored in the resource;
- determine, via the authenticator application, whether the biometric marker received from the user satisfies a biometric criterion based on the existing biometric authentication of the user; and
- upon the determination that the biometric criterion is satisfied, communicate, via the authenticator application, with the support server to enable the potential transaction to be performed.

12. The media of claim 11, wherein the user identifiable information is a hashed email.

13. The media of claim 11, wherein the user identifiable information is a hashed primary account number.

* * * * *